(12) United States Patent
Ghorbani et al.

(10) Patent No.: US 10,770,873 B2
(45) Date of Patent: Sep. 8, 2020

(54) FLEXIBLE VULCANIZED JOINT BETWEEN TWO ELECTRIC POWER CABLES AND PROCESS FOR PRODUCING SAID JOINT

(71) Applicant: NKT HV Cables AB, Lyckeby (SE)

(72) Inventors: Hossein Ghorbani, Malmö (SE); Eric Rèbillard, Karlskrona (SE); Svetlana Zlatkovic, Karlskrona (SE); Sofie Lindahl, Karlskrona (SE)

(73) Assignee: NKT HV Cables AB, Lyckeby (SE)

( * ) Notice: Subject to any disclaimer, the term of this patent is extended or adjusted under 35 U.S.C. 154(b) by 204 days.

(21) Appl. No.: 15/778,548

(22) PCT Filed: Nov. 23, 2015

(86) PCT No.: PCT/EP2015/077333
§ 371 (c)(1),
(2) Date: May 23, 2018

(87) PCT Pub. No.: WO2017/088899
PCT Pub. Date: Jun. 1, 2017

(65) Prior Publication Data
US 2018/0287354 A1    Oct. 4, 2018

(51) Int. Cl.
  *H02G 1/14*       (2006.01)
  *H01B 3/44*       (2006.01)
  *H02G 15/00*      (2006.01)
  *H02G 15/18*      (2006.01)

(52) U.S. Cl.
  CPC .............. *H02G 1/14* (2013.01); *H01B 3/441* (2013.01); *H02G 15/003* (2013.01); *H02G 15/18* (2013.01)

(58) Field of Classification Search
  None
  See application file for complete search history.

(56) References Cited

U.S. PATENT DOCUMENTS

| 5,187,009 A | 2/1993 | Kimura et al. |
| 2010/0139974 A1 | 6/2010 | Christen |

FOREIGN PATENT DOCUMENTS

| CN | 1667897 A | 9/2005 |
| CN | 101068075 A | 11/2007 |

(Continued)

OTHER PUBLICATIONS

Yasumasa Maeno et al: "Maeno et al: Effects of Crosslinking Byproducts on Space Charge Formation in Crosslinked Polyethylene Effects of Crosslinking Byproducts on Space Charge Formation in Crosslinked Polyethylene", IEEE Transaction on Dilectrics and Electrical Insulation, Feb. 22, 2005.

(Continued)

*Primary Examiner* — Jeffry H Aftergut
(74) *Attorney, Agent, or Firm* — Whitmyer IP Group LLC

(57) ABSTRACT

A process for producing a flexible vulcanized joint between two electric power cables includes the steps of: producing an exposed conductor joint between each end of the two cable ends to be joined; producing an inner semi-conducting layer thereby radially surrounding and covering the exposed conductor joint; winding an insulation tape including an organic peroxide around the inner semi-conducting layer thereby radially surrounding and covering the inner semi-conducting layer; curing the insulation tape to produce an insulation layer; and producing an outer semi-conducting layer thereby radially surrounding and covering the insulation layer. The step of winding the insulation tape around the inner semi-conductor layer is performed under an oxygen-free atmosphere. The present invention also provides a flexible vulcanized joint produced by this process, and an electric power cable including such a joint.

13 Claims, 6 Drawing Sheets

(56) References Cited

FOREIGN PATENT DOCUMENTS

| CN | 101902024 A | | 12/2010 |
|---|---|---|---|
| CN | 102593764 B | | 5/2014 |
| JP | S6356108 A | | 3/1988 |
| JP | 06-006925 A | * | 1/1994 |
| JP | 06-006925 A | * | 7/1994 |
| JP | H07336836 A | | 12/1995 |
| JP | 10-042418 A | * | 2/1998 |

OTHER PUBLICATIONS

International Preliminary Report on Patentability Application No. PCT/EP2015/077333 Issued: Oct. 24, 2017 8 pages.
International Search Report and Written Opinion of the International Searching Authority Application No. PCT/EP2015/077333 Completed: Aug. 3, 2016; dated Aug. 10, 2016 16 pages.
Andrews T. et al: "The role of degassing in XLPE power cable manufacture", IEEE Electrical Insulation Magazine, IEEE Service Center, New York, NY, US vol. 22, No. 6, Nov. 1, 2006.
Japanese Office Action and Translation Application No. 2018-526680 dated Oct. 29, 2019 16 pages.
Chinese Office Action and Translation Application No. 201580085748.9 completed: Apr. 12, 2019; dated Apr. 22, 2019 10 Pages.
Translated Chinese Search Report Application No. 201580085748.9 Completed: Apr. 22, 2019 2 Pages.
Third Chinese Office Action and Translation Application No. 201580085748.9 Completed: Apr. 29, 2020 8 Pages.
Chinese Office Action and Search Report with Translation Application No. 201580085748.9 Completed: Feb. 6, 2020 19 Pages.

* cited by examiner

FLEXIBLE VULCANIZED JOINT BETWEEN TWO ELECTRIC POWER CABLES AND PROCESS FOR PRODUCING SAID JOINT

TECHNICAL FIELD

The present invention relates to a process for producing a flexible vulcanized joint between two electric power cables, as defined in the appended claims, and a flexible vulcanized joint between two electric power cables produced according to the process. The present invention also related to an electric power cable comprising the flexible vulcanized joint, as defined in the appended claims.

BACKGROUND

Electric power cables are used to transmit electric power at a medium or high voltage. Different insulation materials can be used in power cable applications, including paper and oil, mass-impregnated cables and polymeric materials. Extruded power cables comprise normally a conductor and radially surrounding polymeric insulation system comprising at least two semi-conducting layers and one insulation layer comprising polymeric material. Electric power cables may be buried into the ground whereby they are called land cables. The electric power cables may also be buried into a sea bed or they may extend between two fixing points in sea water and cables of this type are called submarine, sea water or underwater power cables. Areas where energy is on the one hand needed and on the other hand produced may be located at a long distance from each other, which increases a need for safe power transfer.

In order to meet the demands for safe power transfer, the insulation systems in the cables need to be of high quality to ensure correct electrical and mechanical behavior during the transmission of electric power. To electrically insulate the conductor, an insulation system including semi-conducting and insulating polymeric layers is arranged to surround the conductor. Unless the power cables are appropriately insulated, significant leakage currents will flow in the radial direction of the cables, from the conductor to the surrounding grounded screen. Such leakage currents give rise to significant power losses, as well as to heating of the electrical insulation. The heating of the insulation can further increase the leakage current due to the reduction of the resistance with the increasing temperature. To avoid power losses and possible thermal runaway, the leakage current should therefore be kept as small and stable as possible.

There are limitations to the length of cable that can be continuously manufactured. Therefore, in order to be able to transfer power over the large distances required, it is necessary to be able to safely and effectively join separate lengths of cable. When a cable has to be joined, or spliced, with another cable, all of the cable layers of one cable must be joined to the corresponding layers of the other cable. The present invention concerns in particular issues related to the cable insulation in such a cable joint.

A common type of electric power cable is a cross-linked polyethylene insulated cable, which is usually called XLPE cable for short. This type of cable has an insulation layer produced by extrusion of a low density polyethylene (LDPE) base polymer comprising an organic peroxide cross-linking agent. The extruded insulation layer is then subjected to high temperature and pressure curing conditions in order to homolytically cleave the organic peroxide, forming free radicals that facilitate cross-linking of the polyethylene, thus forming XLPE.

Cables may be joined using a variety of methods. Land cables are commonly joined using prefabricated joints, which are pre-molded devices to which the cable ends are connected. Submarine cables are commonly joined using sea joints, also known as factory joints or flexible vulcanized joints (FVJ).

When producing a flexible vulcanized joint, first of all the conductor ends are denuded of all external layers, commonly by tapering down the cable insulation system to form a conical shape with the exposed conductor protruding from the top of the cone. The conductors are then electrically and mechanically connected to each other, often by welding, soldering or brazing. Next, the electric insulation system is systematically restored. This is done by first restoring the inner semi-conducting layer by winding an extruded semi-conducting tape around the conductor, followed by melting and curing. Then, the insulation layer is restored by winding an extruded insulating tape around the newly produced inner semi-conducting layer, followed by melting and curing. Finally, the outer semi-conducting layer is restored by winding an extruded semiconducting tape around the newly produced insulation layer, followed by melting and curing. The goal is to recreate the cable in the joint by building it from the inside out and thus restore all layers of the cable in the joint.

It is essential that no impurities are incorporated into the insulation system during the production of the joint, since this could lead to impaired insulating properties, the incidence of stress points, and ultimately joint failure. Therefore, the layers of the insulation system are produced under clean conditions. Each step of winding the extruded tapes is performed in a glove box under a positive pressure of clean air to avoid contaminants. The partly-produced joint is then transferred to a vulcanization tube where it is cured using elevated temperatures under a nitrogen atmosphere.

However, despite the meticulous conditions used, joints prepared in this manner still have a higher leakage current than the extruded XLPE cables and therefore an increased risk for thermal runaway, and ultimately failure. Therefore, there is a need for a process that provides flexible vulcanized joints that have a higher robustness and stability.

SUMMARY

It is an object of the invention to improve upon the prior art flexible vulcanized joints.

More specifically, it is an object of the present invention to provide a flexible vulcanized joint with an insulation system having lower conductivity as compared to joints known in the art.

It is also an object of the present invention to provide a flexible vulcanized joint having a lower leakage current at a given voltage as compared to joints known in the art.

It is also an object of the present invention to provide a flexible vulcanized joint that can be operated at higher conductor temperatures and higher voltage levels as compared to joints known in the art.

It is a further object of the present invention to provide a flexible vulcanized joint requiring shorter degassing times as compared to joints known in the art.

It is also an object of the present invention to provide a flexible vulcanized joint having an insulation system with improved bonding to the extruded cable insulation system of the joined cables.

It is also an object of the present invention to provide a simple and cost-effective process for manufacturing a flexible vulcanized joint that possesses all of the properties mentioned above.

The inventors of the present invention have realized that in prior art flexible vulcanized joints there is a problem of obtaining a joint insulation system with sufficiently low conductivity and corresponding low leakage current when in use. The inventors have realized that this is due to the presence of water in the insulation system, which increases the conductivity and makes the system unstable under a high-voltage DC (direct current) field. Moreover, the inventors have realized that this water formation is due to the dehydration of alcohol by-products derived from the organic peroxide cross-linking agent. Furthermore, the inventors have discovered that this dehydration reaction is facilitated by the presence of trapped air pockets formed during winding of the extruded tapes around the joint. Following on from this discovery, the inventors have discovered that winding the insulator system tapes in the absence of oxygen provides a flexible vulcanized joint with lower water content and therefore lower conductivity.

The above-mentioned objects are thus achieved by a process for producing a flexible vulcanized joint between two electric power cables, each cable comprising a metal conductor and an electric insulation system radially surrounding the conductor, the electric insulation system comprising an inner semi-conducting layer, an insulation layer, and an outer semi-conducting layer, the process comprising the following steps:
  I. Producing an exposed conductor joint between each end of the two cable ends to be joined;
  II. Producing an inner semi-conducting layer that radially surrounds and covers the exposed conductor joint;
  III. Winding an insulation tape comprising an organic peroxide around the inner semi-conducting layer thereby radially surrounding and covering the inner semi-conducting layer;
  IV. Curing the insulation tape and thereby producing an insulation layer; and
  V. Producing an outer semi-conducting layer that radially surrounds and covers the insulation layer;
  wherein the step iii) of winding an insulation tape around the inner semi-conductor layer is performed under an oxygen-free atmosphere.

By performing step iii) of winding the insulation tape comprising an organic peroxide around the inner semi-conductor layer under an oxygen-free atmosphere, a number of advantages are obtained. The dehydration of cross-linking by-products to form water, which occurs during prior art methods, is inhibited. Therefore, the insulation system of the flexible vulcanized joint obtained by the process of the invention contains near-negligible quantities of water. Because the insulation system is substantially free from water, it has a lower conductivity and a lower leakage current at a given voltage as compared to prior art joints. The flexible vulcanized joints thus produced will also have a stable chemical composition in their insulation system and their risk of failure is therefore correspondingly minimized. The low water content and low conductivity of the insulation system makes it possible to operate the flexible vulcanized joint at higher conductor temperatures and higher voltage levels. Moreover, by eliminating the formation of water in the flexible vulcanized joint insulation system, the degassing time required for the insulation system is reduced. Furthermore, by winding the joint insulation tape under an oxygen-free atmosphere, oxidisation of exposed surfaces of the cable insulation system is avoided, and thus an improved bonding is achieved between the joint insulation system and the cable insulation system.

According to another feature of the present invention, the oxygen-free atmosphere is nitrogen, carbon dioxide, or a noble gas such as argon, preferably nitrogen. This ensures the provision of a cheap and readily-available source of oxygen-free atmosphere. The step iii) of winding an insulation tape around the inner semi-conducting layer can be performed in a glovebox at a gas pressure in excess of the ambient atmospheric pressure. In this way the process can be performed cost-effectively and by means of relatively simple process equipment.

According to yet another feature of the present invention, the insulation tape comprises a polyolefin, preferably polyethylene, polypropylene, EPDM rubber or EPM rubber, most preferably LDPE polyethylene. This means that the present invention is compatible with a wide range of power cable insulation systems.

According to still another feature of the present invention, the organic peroxide used in step iii) for producing the insulation layer is selected from dicumyl peroxide, bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof, preferably dicumyl peroxide. This means that the present invention is applicable to producing flexible vulcanized joints with insulation layers comprising a wide range of cross-linking agents with a large range of curing temperatures and matrix compatibilities.

According to a further feature of the present invention, step ii) of producing the inner semi-conducting layer comprises the sub-steps of:
  ii)a. Winding a semi-conducting film comprising an organic peroxide selected from bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof, around the exposed conductor joint thereby radially surrounding and covering the exposed conductor joint;
  ii)b. Curing the semi-conducting film and thereby producing an inner semi-conducting layer.

Thereby the preparation of the inner semi-conducting film by using the same techniques and apparatus as for the insulation layer of the flexible vulcanized joint is facilitated, thus increasing the utilization of plant capital equipment.

According to still a further feature of the present invention, the step v) of producing the outer semi-conducting layer comprises the sub-steps of:
  v)a. Winding a semi-conducting film comprising an organic peroxide selected from bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof, around the insulation layer thereby radially surrounding and covering the insulation layer;
  v)b. Curing the semi-conducting film and thereby producing an outer semi-conducting layer.

Thereby the preparation of the outer semi-conducting film by using the same techniques and apparatus as for the insulation layer of the flexible vulcanized joint is facilitated, thus increasing the utilization of plant capital equipment.

According to one more features of the present invention, at least one of the sub-steps ii)a or v)a is performed under an oxygen-free atmosphere. The oxygen-free atmosphere can be nitrogen, carbon dioxide, or a noble gas such as argon, preferably nitrogen. This provides a joint insulation system containing even smaller quantities of water.

According to yet a further feature of the present invention, the at least one sub-step ii)a or sub-step v)a is performed in a glovebox at a gas pressure in excess of the ambient atmospheric pressure. This provides a robust method of ensuring that the insulation tape is wound in an oxygen-free atmosphere, whilst still allowing for the utilization of prior-art equipment.

The objects above are also attained by a flexible vulcanized joint produced according to the process outlined above, comprising a metal conductor and an electric insulation system radially surrounding the conductor, the electric insulation system comprising:

a) an inner semi-conducting layer radially surrounding the conductor;
b) an insulation layer radially surrounding the inner semi-conducting layer, wherein the insulation layer is produced by curing of an insulation tape comprising an organic peroxide, and wherein the insulation layer comprises alcohol by-products derived from the organic peroxide, or alcohol by-products derived from the organic peroxide together with dehydration products derived from the alcohol by-products; and
c) an outer semi-conducting layer radially surrounding the insulation layer;

wherein the total w/w concentration of the alcohol by-products in the insulation layer exceeds the total w/w concentration of dehydration products in the insulation layer, when measured prior to degassing the flexible vulcanized joint. The total w/w concentration of the alcohol by-products in the insulation layer thus exceeds the total w/w concentration of any dehydration products in the insulation layer. The concentration of the dehydration products may be zero or nearly zero.

The concentration of dehydration products formed in the insulation system of the flexible vulcanized joint correlates with the concentration of water in the insulation system of the flexible vulcanized joint. The insulation system defined above contains low concentration of dehydration products and therefore no water or near-negligible quantities of water. Because the insulation system is substantially free from water, it has a lower conductivity and a lower leakage current at a given voltage as compared to prior art joints. The flexible vulcanized joints defined above will also have a stable chemical composition in their insulation system and their risk of failure is therefore correspondingly minimized. The low water content and low conductivity of the insulation system makes it possible to operate the flexible vulcanized joint at higher conductor temperatures and higher voltage levels. Moreover, by eliminating the formation of water in the flexible vulcanized joint insulation system, the degassing time required for the insulation system is reduced. Furthermore, since the flexible vulcanized joint defined above does not suffer from oxidization of exposed insulation surfaces, an improved bonding is achieved between the joint insulation system and the cable insulation system.

According to one feature of the present invention, the total w/w concentration of the alcohol by-products in the insulation layer is at least five times the total w/w concentration of dehydration products in the insulation layer, when measured prior to degassing the flexible vulcanized joint. This ensures a reduced tendency for water formation in the insulation system, even in the long term.

According to another feature of the present invention, the insulation layer comprises a polyolefin, preferably polyethylene, polypropylene, EPDM rubber or FPM rubber, most preferably XLPE polyethylene. This means that the present invention is compatible with a wide range of power cable insulation systems.

According to yet another feature of the present invention, the organic peroxide used in the insulation layer is selected from dicumyl peroxide, bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof, preferably dicumyl peroxide. This means that the present invention is applicable to insulation layers comprising a wide range of cross-linking agents with a large range of curing temperatures and matrix compatibilities.

According to a feature of the present invention, the inner and/or the outer semi-conducting layer are/is produced by curing a semi-conducting film comprising an organic peroxide selected from bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1-di(t-butylperoxy)-3,3,5-trimethylcyclohexane, or mixtures thereof. Thereby the preparation of the inner and/or outer semi-conducting film by using the same techniques and apparatus as for the insulation layer of the flexible vulcanized joint is facilitated, thus increasing the utilization of plant capital equipment.

According to still another feature of the present invention, the total w/w concentration of alcohol by-products in the inner semi-conducting layer exceeds the total w/w concentration of dehydration products in the inner semi-conducting layer, when measured prior to degassing the flexible vulcanized joint. The total w/w concentration of any alcohol by-products in the inner semi-conducting layer thus exceeds the total w/w concentration of any dehydration products in the inner semi-conducting layer. The concentration of the dehydration products may be zero or nearly zero.

This provides a flexible vulcanized joint insulation system containing even smaller quantities of water, which is advantageous since the inner conductor layer typically is difficult to degas and requires long degassing times.

According to a further feature of the present invention, the total w/w concentration of alcohol by-products in the outer semi-conducting layer exceeds the total w/w concentration of dehydration products in the outer semi-conducting layer, when measured prior to degassing the flexible vulcanized joint. The total w/w concentration of any alcohol by-products in the outer semi-conducting layer thus exceeds the total w/w concentration of any dehydration products in the outer semi-conducting layer, when measured prior to degassing the flexible vulcanized joint. The concentration of the dehydration products may be zero or nearly zero. This provides a flexible vulcanized joint insulation system containing even smaller quantities of water.

The objects above are also attained by an electric power cable comprising a flexible vulcanized joint as outlined above.

The invention will now be further described with reference to the appended drawings.

Figure 1:
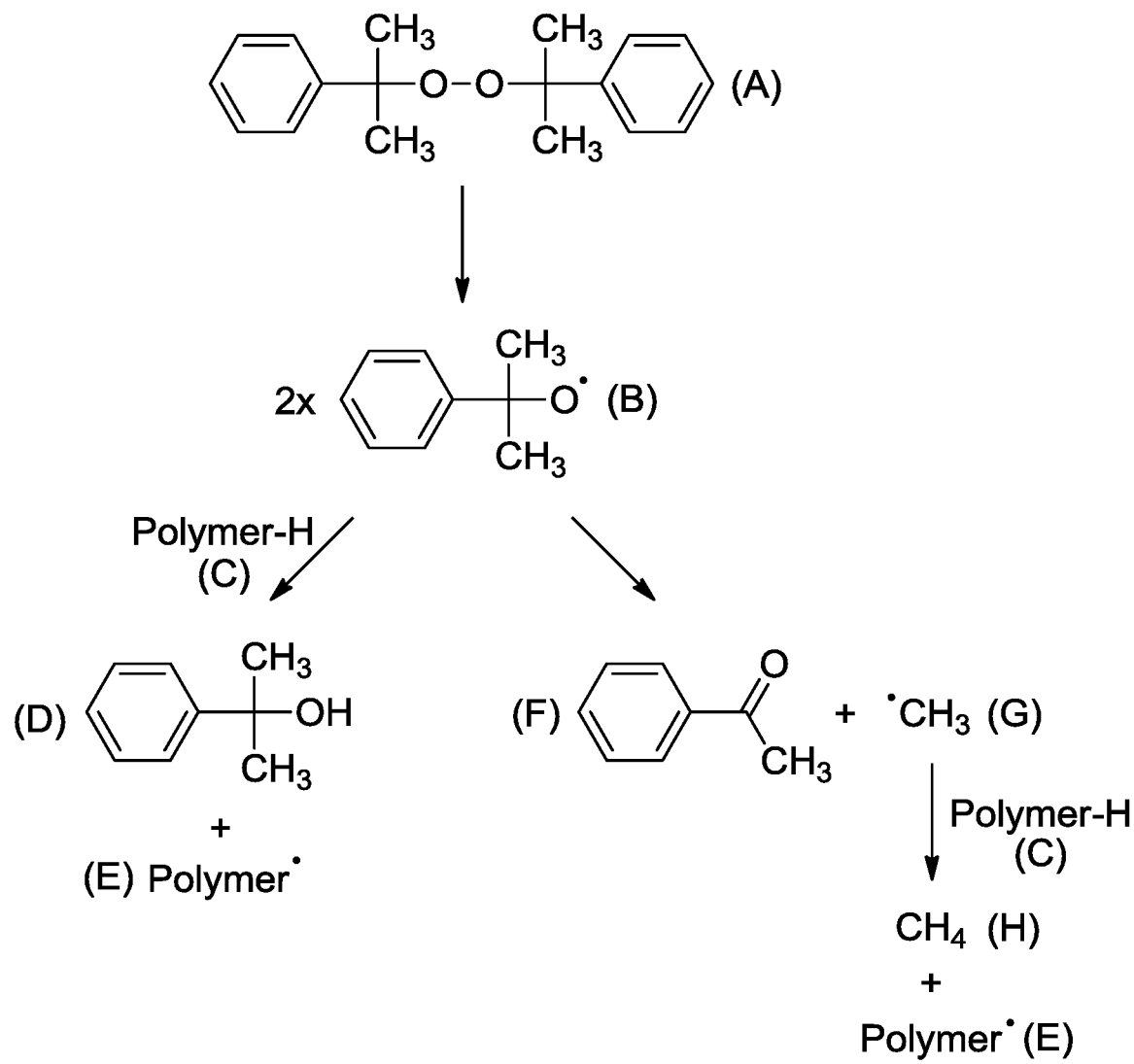
FIG. 1 schematically illustrates the cross-linking reactions and by-products of organic peroxide cross-linking agents, exemplified using dicumyl peroxide.
Figure 1:
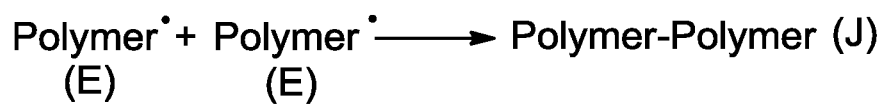
Figure 1:
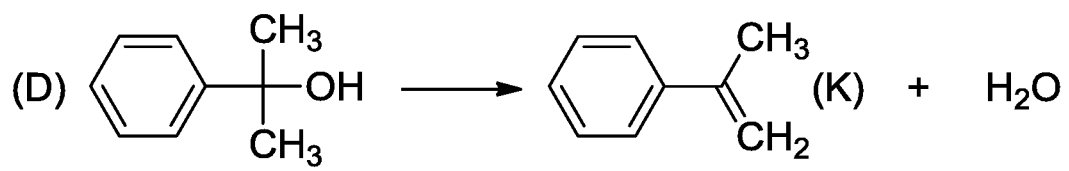

Further features and advantages will be described in the following detailed description.

DETAILED DESCRIPTION

Electric power cables, also called electric transmission power cables, are intended for transmitting electric power. Often, it is desirable to transmit power over long distances, especially using high-voltage direct current (HVDC) transmission systems. Although it is possible to produce continuous cables in lengths of more than 20 km in a single extrusion run, transferring power over long distances still requires that separate cable lengths be joined together.

The electric power cables to be joined are preferably of a type single phase electric power cable. For example, the cables may be high voltage direct current (HVDC) cables, extra high voltage cables (EHV), medium-voltage cables or low-voltage cables. The cables may be underwater power cables or the cables may be land cables. The cables are preferably power transmission cables having a rated voltage of 50 kV or higher, and are thus suitable for use as high voltage transmission power cables. Preferably, the cables are high voltage direct current (HVDC) cables. However, using the present invention, alternating current (AC) cables, such as high voltage AC cables, medium voltage AC cables and low voltage AC cables, may also be joined. The AC cables to be joined may be single or triple-core.

The electric power cables to be joined comprise a conductor, which is usually mainly constituted by a metal such as copper or aluminium (aluminum). The conductor may be stranded, segmental or have keystone shaped profiles. The conductor is surrounded by an electric insulation system which comprises an inner semi-conducting layer, an insulation layer and an outer semi-conducting layer. The insulation layer is located between the semi-conducting layers. Single phase cables comprise one conductor.

Normally, the conductor has a generally circular cross section, even though alternative shapes might be conceived. The radially surrounding electric insulation system with insulation and semi-conducting layers usually has a cross-section with an outer peripheral shape corresponding to the outer peripheral shape of the conductor, normally a generally circular outer periphery, and the insulation system surrounds the conductor radially and concentrically. In this way uniform insulation in the cable can be obtained and electrical properties of the cable can be improved.

According to the present disclosure, the conductor is surrounded by an electric insulation system which comprises an inner semi-conducting layer, an insulation layer and an outer semi-conducting layer.

In the insulation system, the insulation layer should have insulation properties and essentially no conductivity or very low conductivity. The semi-conducting layer or layers can be rendered semi-conducting by using for example fillers having conducting properties.

By insulation layer is meant a layer of a material that resists electricity. The conductivity of the insulation material may be for example of from about $1*10^{-8}$ to about $1*10^{-20}$ S/m at 20° C., typically from $1*10^{-9}$ to $1*10^{-16}$, depending of the magnitude of the electric field.

By semi-conducting layer is meant a layer of a material that has an electrical conductivity that is lower than that of a conductor but that is not an insulator. The conductivity of the semi-conducting material may be typically of larger than $10^{-5}$ S/m at 20° C., such as up to about 10 or $10^2$ S/m. Typically, the conductivity is less than $10^3$ S/m at 20° C.

By conductivity is meant the property of transmitting electricity. The conductivity of a conducting material is more than about $10^3$ S/m at 20° C. For example, carbon black has a conductivity of about 1000 S/m. In theory there is no upper limit, but in practical solutions the upper limit is about $10^8$ S/m at 20° C.

Electric power cables are typically produced by triple extrusion of the insulation system directly onto the conductor. In this manner the insulation system can be directly attached to and arranged to be in contact with the conductor, and thus effective insulation can be provided. The conductor may be also indirectly surrounded by the polymeric insulation system, i.e. the electric power cable may comprise at least one material layer between the conductor and the insulation system. In this way it is possible to e.g. customize cables.

The conductor and the insulation system can be surrounded by further material or layers of material. Further materials and layers may have different tasks such as that of holding the different cable parts together, giving the cable mechanical strength and protecting the cable against physical as well as chemical attacks, e.g. corrosion. Such materials and layers are commonly known to the person skilled in the art. For example, such further materials may include armoring, for example steel wires, or sheath-like barriers to provide a water barrier for the cables.

In the insulation system of the electric power cables to be joined, the polymeric material, i.e. the base polymer of the semi-conducting layers and the insulation layers, typically comprises or consists of a polyolefin-based polymer and can be selected from polyethylene, polypropylene and copolymers or terpolymers of polyethylene and polypropylene, such as EPDM rubber and EDM rubber. Suitable grades of polyethylene for use are low density polyethylene, ultra-low density polyethylene, linear low density polyethylene, high density polyethylene and ultra-high density polyethylene or mixtures thereof. Preferably, the base polymer is low density polyethylene. The polymeric material renders the insulation system relatively thermally stable while an effective insulation property is obtained. The base polymer in all layers of the insulation system is preferably the same so that the production process can be easily controlled. In this way, only different cross-linking agents, fillers and additives need to be added, and the base polymer per se needs not to be modified.

Different additives and fillers can be added to the base polymer to render the polymeric material desired properties. Additives may be for example stabilizers such as antioxidants, nucleating agents, inorganic fillers, cross-linking agents, cross-linking boosters such as 2,4,6-triallyl cyanurate, scorch retard agents and flame retardants. Stabilizers, particularly antioxidants lessen the negative effects of oxidation.

The semi-conducting layer or layers may comprise conductive particles that render the semi-conducting layer the desired conductivity. The conductive particles may be of any kind, such as metallic conductive filler particles, carbon black, graphite or carbon nano-materials. The content of the particles may vary e.g. between 10 to 40% by weight, based on the total weight of the semi-conducting layer. Carbon black is often used due to its stability also at high temperatures.

The two cables to be joined may be identical to one another with regard to all features except length, i.e. have the same conductor material, conductor structure, conductor diameter, insulation system, insulation thickness, etc. The two cables may also differ in various aspects, for example differing in the composition of the insulation system.

The insulation layer of the insulation system of the flexible vulcanized joint is cross-linked using an organic peroxide as a cross-linking agent, in order to produce XLPE. Suitable crosslinking agents for the insulation layer include dicumyl peroxide (Di-Cup®), bis(t-butylperoxyisopropyl)benzene (Vul-Cup®), t-butyl cumyl peroxide (Luperox® D-16), 2,5-di(t-butylperoxy)-2,5-dimethylhexane (Luperox® 101), n-butyl-4,4'-di(t-butylperoxy)valerate (Luperox® 230), 1,1'-di(t-butylperoxy)-3,3,5-trimethylcyclohexane (Luperox® 231), or mixtures thereof. The cross-linking agent used in the insulation layer is preferably dicumyl peroxide.

Each of the inner and/or outer semi-conducting layers of the flexible vulcanized joint may also be cross-linked using an organic peroxide, but each of the layers may also be non-crosslinked and contain no organic peroxide. The cross-linking agent in the insulation layer and in the semi-conducting layers may be different from each other. In this way the cross-linking agent can be adjusted to the specific needs of the respective materials in the layers. Suitable cross-linking agents for the semi-conducting layers include bis(t-butylperoxyisopropyl)benzene (Vul-Cup®), t-butyl cumyl peroxide (Luperox® D-16), 2,5-di(t-butylperoxy)-2,5-dimethylhexane (Luperox® 101), n-butyl-4,4'-di(t-butylperoxy)valerate (Luperox® 230), 1,1'-di(t-butylperoxy)-3,3,5-trimethylcyclohexane (Luperox® 231), or mixtures thereof. A preferred cross-linking agent for use in the semi-conducting layers is bis(t-butylperoxyisopropyl)benzene.

The amount of the cross-linking agent in the respective layers can be from 0.1-2.0% by weight, based on the weight of the base polymer, to ensure sufficient cross-linking.

It is known that polar chemicals, such as water and cross-linking by-products, affect the conductivity in the insulation polymeric materials. Thus, there is a desire to limit the amount of such chemicals in the insulation system of the power cables.

Cross-linking of the polyolefin forming the base polymer in the joint insulation layer is achieved using the organic peroxide. The reaction products and by-products of the organic peroxide cross-linking reactions are shown in FIG. 1. It is important to note that although the reactions have been exemplified using dicumyl peroxide (A), similar reactions and problems ensue when using any other organic peroxide. Upon heating to the curing temperature, the organic peroxide (A) undergoes hemolytic cleavage (dissociation) to form two alkoxy radicals (B). The alkoxy radicals can either undergo β-scission to form acetophenone (F) and a methyl radical (G), or abstract a hydrogen atom from a polymer chain (C) to form cumyl alcohol (D) and a polymer radical (E). The ratio between β-scission and hydrogen atom abstraction is dependent on the reaction conditions. The methyl radical (G) also abstracts a hydrogen atom from a polymer chain (C) to form a polymer radical (E) and methane (H). The polymer radicals (E) combine in a radical termination reaction to provide a cross-link between polymer chains (J). The end products of the cross-linking reaction are thus cross-linked polymer (J), acetophenone (F), cumyl alcohol (D) and methane (H), under ideal conditions. Acetophenone and cumyl alcohol are polar, and methane is flammable, and therefore these by-products are preferably removed by degassing the flexible vulcanized joint.

However, under certain conditions, for instance in acidic environments, cumyl alcohol (D) may undergo dehydration to form α-methyl styrene (K) and water. This does not occur under the near-ideal conditions when triple extruding the cable insulation system, and therefore the α-methyl styrene and water content in the cable insulation system is near negligible. However, under the prior art conditions for producing flexible vulcanized joints by winding insulation tape, this dehydration reaction occurs.

Without wishing to be bound by theory, the inventors believe that air pockets trapped during the winding of the insulation tape cause oxidation of the base polymer and/or any antioxidant present in the insulation tape. These oxidation products, for example carbonyl groups and carboxylic acids, lead to a different and relatively acidic chemical environment for the cumyl alcohol as compared to the environment in the absence of oxidation products. This oxidized, acidic environment is thought to catalyze the dehydration of cumyl alcohol to α-methyl styrene and water. This effect is possibly worsened by the presence of crystalline antioxidant on the surface of the extruded insulation tape (see below). The dehydration reaction can occur at temperatures as low as 70° C., and therefore this reaction can occur not only during heat-treatment of the insulation system, but also throughout the operative life of the flexible vulcanized joint, as long as cumyl alcohol remains undehydrated. This leads to accumulation of water from the insulation layer of the insulation system over time.

It is well known that water leads to increased conductivity and that formation of water makes the insulation system unstable under an HVDC field. Therefore, the formation of water over time by the above-described mechanism leads to a low robustness for DC cable flexible vulcanized joints produced by prior art methods.

In AC cable systems, the presence of even small quantities of water in the insulation system can cause or enhance partial discharges in the insulation material, leading to the growth of water trees and the accelerated aging of the insulation material. If left untreated, water trees may grow to bridge the entire thickness of the insulation system, connecting the high voltage conductor to ground and causing failure of the cable. Therefore, the presence of water in AC cable factory vulcanized joints produced by prior art methods leads to an increased risk of failure of the joint. Dielectric losses in the insulation system are also increased by the presence of water.

The inventors of the present invention have discovered that by winding the insulation tape, and optionally one or both of the semi-conducting films, in an oxygen-free atmosphere, a number of advantages are obtained. By oxygen-free atmosphere it is meant an atmosphere that is substantially free from oxygen, i.e. containing at most about 5% oxygen gas v/v, preferably no more than 1% oxygen gas v/v. Such an atmosphere can be, for example, a nitrogen atmosphere, a carbon dioxide atmosphere, or a noble gas atmosphere, such as an argon atmosphere or an atmosphere with other inert gases.

The primary advantage obtained is that the dehydration reaction described above does not proceed, and therefore a flexible vulcanized joint having an insulation system containing near-negligible quantities of α-methyl styrene and water and water is obtained. Water content can be determined by, for example, Karl Fischer titration. α-Methyl styrene content can be determined, for example, by gas chromatographic methods. It is convenient to determine the concentration of α-methyl styrene and cumyl alcohol using the same method, e.g. gas chromatography. The concentration of α-methyl styrene relative to cumyl alcohol can be used as a measure of the extent to which the dehydration reaction has progressed.

As previously noted, triple-extruded cable insulation systems have little or essentially no formation of α-methyl styrene. In joint cable insulations systems where the insulation tape has been wrapped under air, the cumyl alcohol can be almost entirely dehydrated to α-methyl styrene. According to the present invention, the total w/w concentration of the alcohol by-products (e.g. cumyl alcohol) in the insulation layer exceeds the total w/w concentration of dehydration products (e.g. α-methyl styrene), if any, in the insulation layer, when measured prior to degassing the cable joint. However, it is preferable that the total w/w concentration of the alcohol by-products in the insulation layer is at least five times the total w/w concentration of dehydration products in the insulation layer, when measured prior to degassing the cable joint. Even more preferably, the total w/w concentration of dehydration products in the joint insulation layer is essentially negligible.

Flexible vulcanized joints thus produced will have a stable chemical composition in the insulation layer and thus in the insulation system and their risk of failure is correspondingly minimized.

The low water content and low conductivity of the insulation layer and thus the insulation system makes it possible to operate the flexible vulcanized joint at higher conductor temperatures and higher voltage levels.

By eliminating the formation of water in the flexible vulcanized joint insulation system, the by-product with the highest permittivity is eliminated, and therefore the long degassing times required for prior art flexible vulcanized joints can be reduced.

The formation of an oxidized surface on the exposed surfaces of the cable insulation system leads to inferior bonding between the cable insulation system and the joint insulation system. Without wishing to be bound by theory, this may be because oxidization deactivates the reactive chemical groups on the polymer chain ends, and therefore these chain ends cannot react to the peroxide, which is necessary for obtaining a good adhesion between the polymer chains. It is known in the art to address this problem by shaving away a part of the exposed surface of the cable insulation layer prior to winding the joint insulation tape. By winding the joint insulation tape under an oxygen-free atmosphere, oxidization of exposed surfaces is avoided and thus an improved bonding is achieved between the joint insulation system and the cable insulation system, without the need for shaving away oxidized surfaces.

Figure 2B:
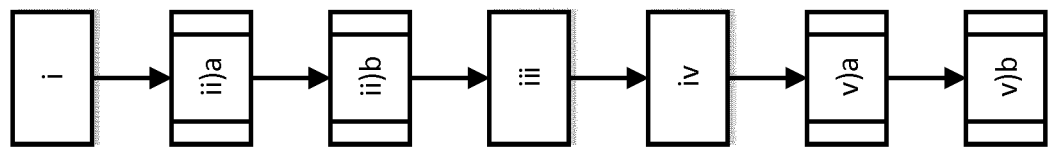
FIG. 2b shows a flowchart of an embodiment of the process for producing a flexible vulcanized joint according to the present invention, wherein steps ii and v are further broken down into sub-steps ii)a, ii)b, v)a and v)b.
Figure 2A:
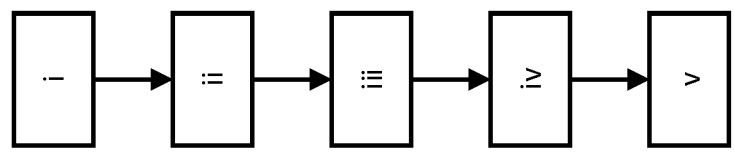
FIG. 2a shows a flowchart of the process for producing a flexible vulcanized joint according to the present invention.

The process for producing a flexible vulcanized joint between two cables according to the present invention will now be described. Reference is made to FIG. 2a showing a flowchart for the process of producing a flexible vulcanized joint and FIG. 2b where the steps ii and v of the process are further broken up into sub-steps ii)a, ii)b, v)a and v)b.

In step i of the process for producing a flexible vulcanized joint, an exposed conductor joint between each end of the two cable ends to be joined is produced.

In step ii of the process, an inner semi-conducting layer that radially surrounds and covers the exposed conductor joint is produced.

Step ii) may be further broken down into sub-steps ii)a and ii)b. In sub-step ii)a a semi-conducting film comprising an organic peroxide selected from bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof is wound around the exposed conductor joint, thereby radially surrounding and covering the exposed conductor joint.

In sub-step ii)b the semi-conducting film is cured, thereby producing an inner semi-conducting layer.

In step iii), an insulation tape comprising an organic peroxide is wound around the inner semi-conducting layer, thereby radially surrounding and covering the inner semi-conducting layer. According to the present invention, this step is performed under an oxygen-free atmosphere.

In step iv), the insulation tape is cured, and thereby an insulation layer is produced.

In step v), an outer semi-conducting layer that radially surrounds and covers the insulation layer is produced.

Step v) may be further broken down into sub-steps v)a and v)b as shown in FIG. 2a. In sub-step v)a a semi-conducting film comprising an organic peroxide selected from bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof is wound around the insulation layer thereby radially surrounding and covering the insulation layer.

In sub-step v)b the semi-conducting film is cured, thereby producing an outer semi-conducting layer.

The entire process for producing a flexible vulcanized joint will now be described in greater detail, with reference to FIGS. 3-7 showing the partially produced joint at various stages of the production process.

When producing a flexible vulcanized joint between two electric power cables, the cable ends to be joined must first be suitably prepared. This is done by stripping back the insulation system adjacent to each of the ends to be joined, thus exposing the conductor core. The insulation system at each cable end is typically tapered in order to provide a larger surface area for the joint insulation system to bond to.

Figure 3A:
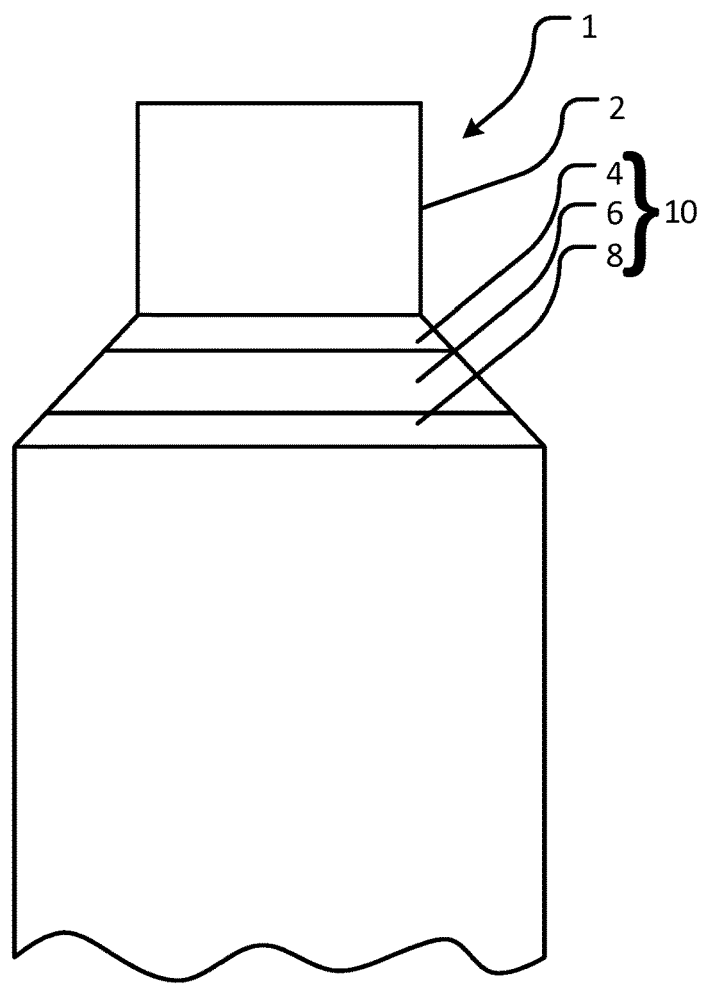
FIG. 3a schematically illustrates a side view of a cable end prepared for joining according to the present invention.
Figure 3B:
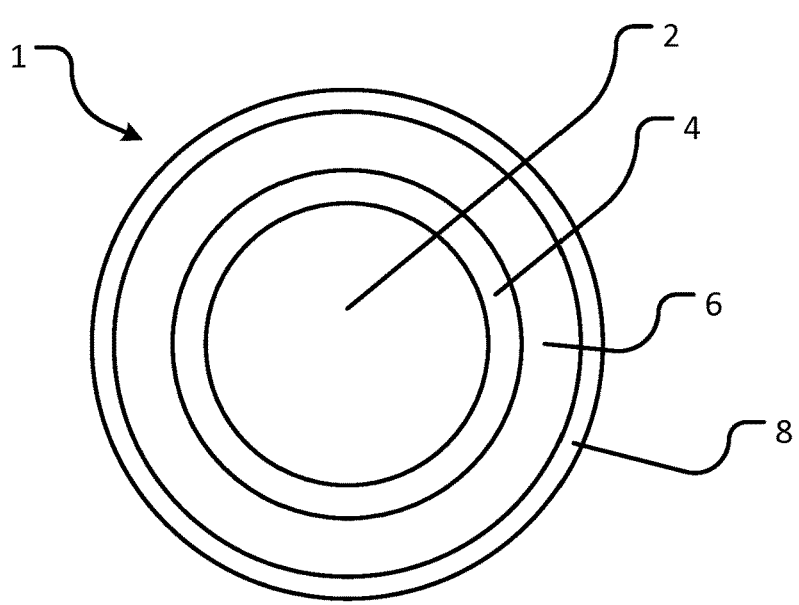
FIG. 3b schematically illustrates a radial cross-section of a cable end prepared for joining according to the present invention.

FIG. 3a is a side view of the end 1 of an electric power cable that has been prepared prior to producing a flexible vulcanized joint. FIG. 3b shows a radial cross section thereof. The cable end 1 comprises a conductor 2, an inner semi-conducting layer 4 radially innermost and closest to the conductor 2, insulation layer 6 radially surrounding and in contact with the inner semi-conducting layer 4 and an outer semi-conducting layer 8 radially outermost from the conductor and in contact with the insulation layer. The inner semi-conducting layer 4, the insulation layer 6 and the outer semi-conducting layer 8 together form an insulation system 10 for the transmission power cable. There may be more than one insulation layer and there may be more than one semi-conducting layer in the insulation system, such as 1-4 insulation layers and 1-4 semi-conducting layers. The cable end 1 that has been prepared for producing a flexible vulcanized joint has had the insulation system 10 stripped back in order to expose the conductor 2. The insulation system 10 is tapered to provide adequate surface area for the insulation system of the flexible vulcanized joint to bond to. The cable end 1 is therefore shaped as a cone from which the conductor 2 protrudes. Both cable ends 1,1' to be joined, as best shown in FIG. 4, are prepared in this manner.

Figure 4:
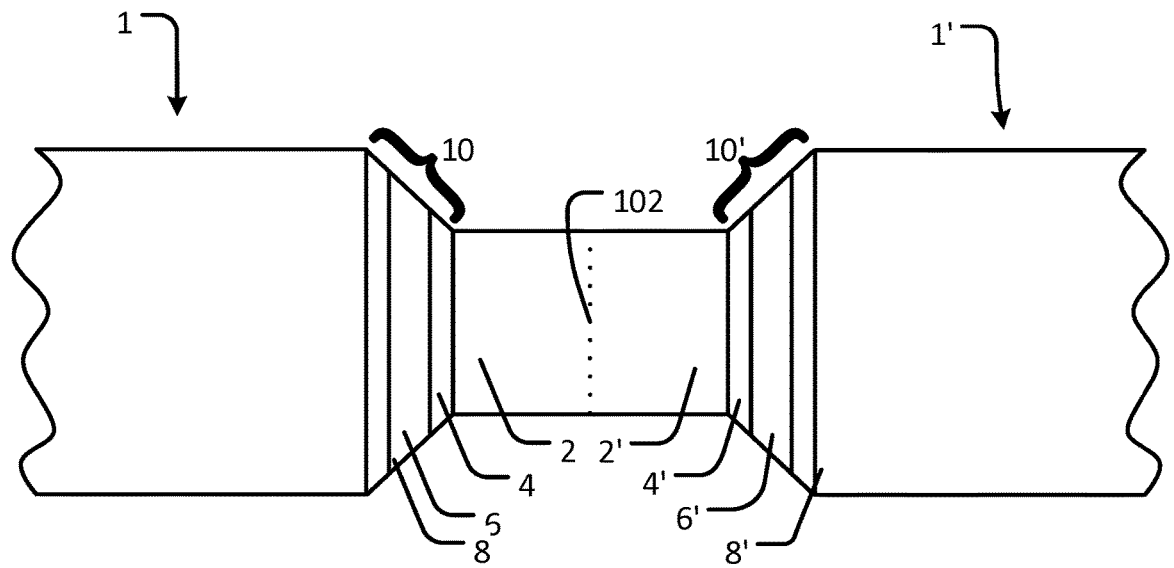
FIG. 4 schematically illustrates an exposed conductor joint produced according to the present invention.

FIG. 4 shows a produced exposed conductor joint. Once both cable ends 1,1' are prepared as described above, the conductors 2,2' of the two ends 1,1' are joined in order to mechanically and electrically connect the two conductors 2,2', thus producing an exposed conductor joint 102. The conductors may be joined using any technique known in the art, such as solid welding, line welding, spot welding, wire-by-wire welding, soldering, brazing, or using a flush compression sleeve.

Once the exposed conductor joint 102 has been produced, the joint insulation system 110 is produced layer by layer, see FIGS. 4-7.

The materials used in producing the joint insulation system 110 are preferably the same as used in the insulation systems 10,10' of the cables to be joined. If each cable has a different insulation system 10,10', then the materials of the joint insulation system 110 are preferably the same as at least one of the cable insulation systems 10,10'. However, the materials used in the joint insulation system 110 may differ from the materials used in both the insulation systems 10,10' of the cables as long as the joint insulation system is compatible with each of the cable insulation systems 10,10'. This requires that the insulation systems can bond to each other and have sufficiently similar mechanical, thermal and electrical properties.

Figure 7:
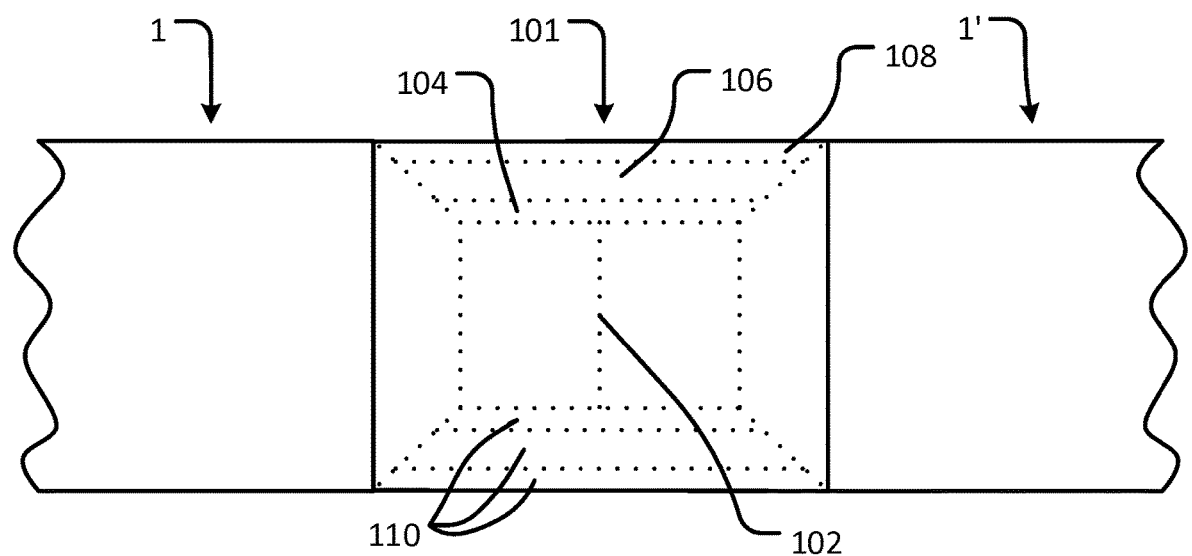
FIG. 7 schematically illustrates a joint outer semi-conducting layer produced according to the present invention.

The semi-conducting layers 104, 108, shown in FIGS. 4 and 7, are typically produced from an extruded thin film consisting of the same material used in the cable semi-conducting layers 4,4', 8,8'. The semi-conducting layer material preferably is a low density polyethylene (LDPE) comprising an organic peroxide selected from bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof, i.e. an XLPE precursor. The organic peroxide is preferably bis(t-butylperoxyisopropyl)benzene, known under the trade name Vul-Cup®. The semi-conducting layer material preferably comprises carbon black in order to provide the desired semi-conducting properties. The semi-conducting layer material may comprise further additives commonly found in electric power cables and known in the art, as discussed above.

Figure 6:
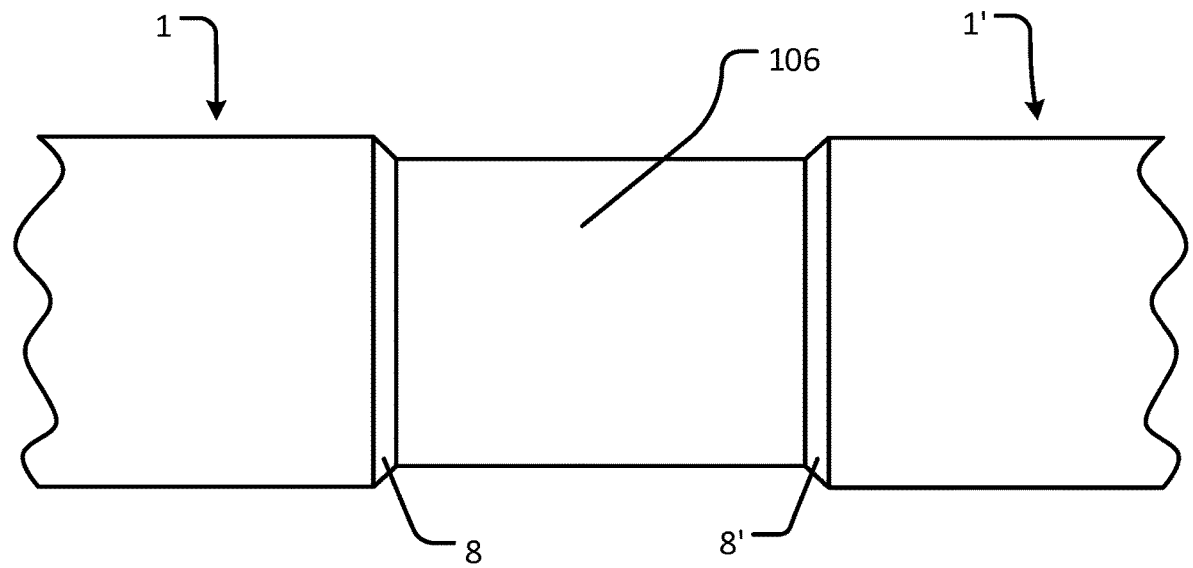
FIG. 6 schematically illustrates a joint insulation layer produced according to the present invention.

The insulation layer 106, shown in FIG. 6, is typically produced from an extruded insulation tape consisting of the same material used in the cable insulation layers 6,6'. The insulation layer material is preferably a low density polyethylene (LDPE) comprising an organic peroxide, i.e. an XLPE precursor. Suitable crosslinking agents for the insulation layer include dicumyl peroxide (Di-Cup®), bis(t-butylperoxyisopropyl)benzene (Vul-Cup®), t-butyl cumyl peroxide (Luperox® D-16), 2,5-di(t-butylperoxy)-2,5-dimethylhexane (Luperox® 101), n-butyl-4,4'-di(t-butylperoxy) valerate (Luperox® 230), 1,1'-di(t-butylperoxy)-3,3,5-trimethylcyclohexane (Luperox® 231), or mixtures thereof. The organic peroxide is preferably dicumyl peroxide, known under the trade name Di-Cup®. The insulation layer material may comprise further additives commonly found in electric power cables and known in the art, as discussed above.

It is recognized in the art that the extruded insulation tape and semi-conducting film often have some antioxidant material crystallized at the surface. This is due to the antioxidant diffusing from the polymer matrix during storage, after extrusion of the tape or film. The extruded insulation tape and semi-conducting film is typically stored in cool conditions for up to six months prior to use.

Figure 5:
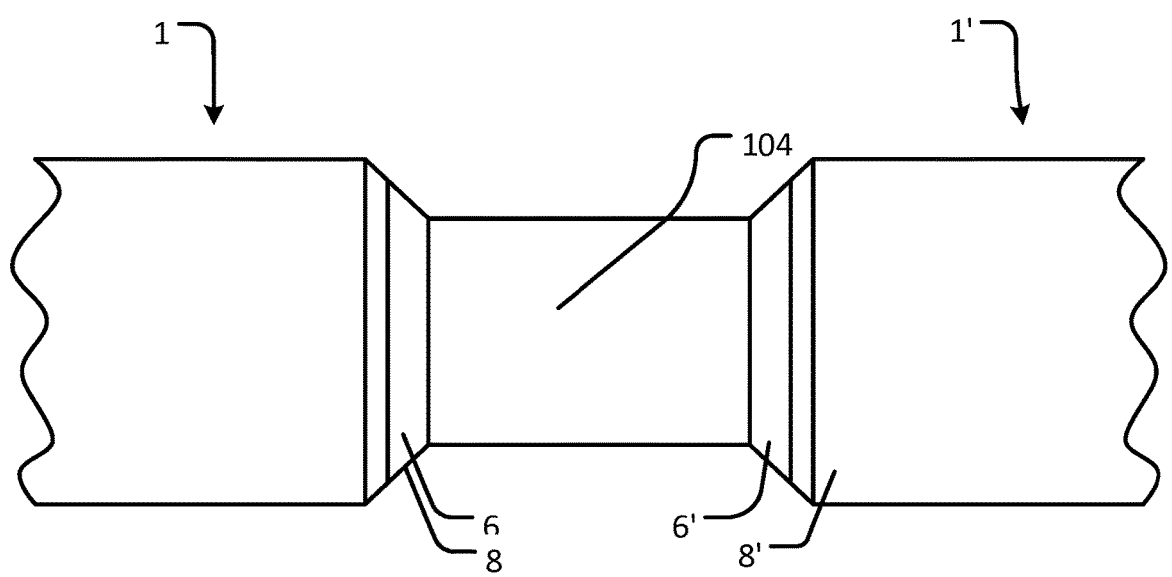
FIG. 5 schematically illustrates a joint inner semi-conducting layer produced according to the present invention.

The first of the joint insulation layers to be produced is the inner semi-conducting layer 104, shown in FIG. 5. This is typically performed by winding a semi-conducting thin film as described above around the exposed conductor joint 102. This can be done in a glove box using a positive pressure of clean air, i.e. the pressure in the glove box exceeds the surrounding ambient pressure so that any leakage in the glove box leads to gas flow out of the glove box and not into the glove box. Alternatively, the winding of the semi-conducting thin film can be performed in an oxygen-free atmosphere which is nitrogen, carbon dioxide, or a noble gas such as argon, preferably nitrogen. The atmosphere is obtained e.g. by filling the glove box with the inert gas such as nitrogen, carbon dioxide or argon. This however is not strictly necessary because the inner semi-conducting layer 104 is much thinner relative to the joint insulation layer 106 and therefore accounts for relatively small quantities of moisture formation.

After winding, the partially produced joint is cured in a vulcanization tube at an elevated temperature of from 130° C. to 300° C. in order to produce the joint inner semi-conducting layer 104. The curing method is preferably dry curing using elevated pressures of nitrogen, as known in the art.

Alternatively, the inner semi-conducting layer 104 may be produced by, for example, injection molding using a mold radially surrounding the exposed conductor joint 102, followed by curing.

The next layer to be produced is the joint insulator layer 106, as shown in FIG. 6. This is always performed in two steps. The first step, involves winding an insulator tape as described above around the joint inner semi-conductor layer 104. According to the present invention, the winding is performed in an oxygen-free atmosphere, typically in a glove box using a positive pressure of an inert gas such as nitrogen, carbon dioxide or argon, preferably nitrogen. The atmosphere is obtained e.g. by filling the glove box with the inert gas such as nitrogen, carbon dioxide or argon. This means that the inert gas pressure in the glove box exceeds the surrounding ambient pressure so that any leakage in the glove box leads to inert gas flow out of the glove box and not air flow into the glove box.

By oxygen-free atmosphere it is meant an atmosphere that is substantially free from oxygen, i.e. containing at most about 5% oxygen gas v/v, preferably no more than 1% oxygen gas v/v. Such an atmosphere can be, for example, a nitrogen atmosphere, a carbon dioxide atmosphere, or a noble gas atmosphere, such as an argon atmosphere, or an atmosphere with other inert gases. After winding, the partially produced joint is then cured in a vulcanization tube at an elevated temperature of from 130° C. to 300° C. in order to produce the joint insulation layer 106. The curing method is preferably dry curing using elevated pressures of nitrogen, as known in the art.

The final layer of the joint insulation system 110 to be produced is the outer semi-conducting layer 108, as shown in FIG. 7. This can be done by winding a semi-conducting thin film as described above around the joint insulation layer 106. This is typically performed in a glove box using a positive pressure of clean air, i.e. the pressure in the glove box exceeds the surrounding ambient pressure so that any leakage in the glove box leads to gas flow out of the glove box and not into the glove box. Alternatively, the winding of the semi-conducting thin film can be performed in an oxygen-free atmosphere which is nitrogen, carbon dioxide, or a noble gas such as argon, preferably nitrogen. The atmosphere is obtained by first filling the glove box with the inert gas such as nitrogen, carbon dioxide or argon. This however is not strictly necessary because the outer semi-conducting layer 108 is much thinner relative to the joint insulation layer 106 and therefore accounts for relatively small quantities of moisture formation. Furthermore, since the outer semiconductor layer is the outermost of the layers of the insulation system, by-products are relatively easily removed from this layer during degassing.

After winding the partially produced joint is then cured in a vulcanization tube at an elevated temperature of from 130° C. to 300° C. in order to produce the joint outer semi-conducting layer 108. The curing method is preferably dry curing using elevated pressures of nitrogen, as known in the art.

Alternatively, the outer semi-conducting layer 108 may be produced by, for example, injection molding using a mold radially surrounding the joint insulation layer 106, followed by curing.

Once the outer semi-conducting layer is produced, the flexible vulcanized joint 101 is complete. FIG. 7 shows the complete joint, with dotted lines denoting the presence of the conductor joint 102, joint inner semi-conducting layer 104 and joint insulation layer 106 in the interior of the flexible vulcanized joint 101.

The thus produced flexible vulcanized joint 101 can optionally be heat treated and degassed if necessary. The heat-treating may be performed in an oven or by using any other technology known in the art and apparent to the skilled person. In this way, the amount of by-products in the joint insulation system 110 can be further decreased.

The examples provided below demonstrate the effects of winding the insulation tape under an oxygen-free atmosphere.

EXPERIMENTAL

A series of experiments was carried out in order to study the formation of Alpha-Methyl-Styrene and water from Cumyl-Alcohol in the insulation of our HVDC factory vulcanized joint.

The polymer studied was Borlink LS4258DCE, a commercially available polymer from Borealis. This polymer is typically used in the insulation layer of cables and factory vulcanized joints, and comprises an LOPE base polymer and dicumyl peroxide (DiCup) as the cross-linking agent. In some samples, additional antioxidant, 4,4'-thiobis(3-methyl-6-t-butylphenol) (Santonox), was added. Aluminium foil was used as a diffusion barrier during pressing, vulcanization and heat treatment. However, BoPET (Mylar®) film is also suitable for this purpose.

In the study, 5 Plate samples, each 1 mm thick were press molded using L54258DCE tapes, the same as used in FVJ production, with different settings as below:

Sample 1: Was prepared with LS4258DCE tape and 0.5 g Santonox powder (antioxidant) in ambient air atmosphere. The sample was pressed, and then subjected to 4 hours long vulcanization time, followed by three days of heat-treatment sandwiched between diffusion barriers at 80° C.

Sample 2: Was prepared with LS4258DCE tape and 0.5 g Santonox powder added over the tapes, in ambient air atmosphere. The tape was then heat-treated for 24 h at 85° C. prior to pressing. The plate sample was pressed with 30 minutes long vulcanization time and the plate sample was then heat-treated for three days sandwiched between diffusion barriers at 80° C.

Sample 3: Was prepared with LS4258DCE tape without added Santonox in a Nitrogen-filled glovebox (no oxygen in contact with the materials during pressing); pressed with 30 minutes vulcanization time and heat-treatment for three days sandwiched between diffusion barriers at 80° C.

Sample 4: Was prepared with LS4258DCE tape with 0.5 g added Santonox powder over the tape in a Nitrogen-filled glovebox (no oxygen in contact with the materials during pressing); pressed with 30 minutes vulcanization time and heat-treatment for three days sandwiched between diffusion barriers at 80° C.

Sample 5: Was prepared with LS4258DCE tape with 0.5 g added Santonox powder over the tape in ambient air atmosphere; pressed with 30 minutes vulcanization time and heat-treatment for three days sandwiched between diffusion barriers at 80° C.

Sample 1 is to simulate the effect of long vulcanization time; sample 2 was to see if heat-treatment of the tape would help to solve the problem of water formation in the insulation material; samples 3 and 4 are to see the effect of eliminating oxidization by pressing in Nitrogen environment; sample 5 is pressed in with normal air to be compared to sample 4. Therefore, samples 1, 2 and 5 are reference samples, not in accordance with the present invention, whereas samples 3 and 4 are inventive samples, in accordance with the present invention.

All samples were stored in freezer to keep the composition intact during the storage. Finally, the crosslinking by-product content of the samples was measured using Gas Chromatography (GC). The by-product content of the samples was measured at 9 different diagonal positions on each plate sample, of which the fifth measurement was at the centre of each plate sample.

Figure 8:
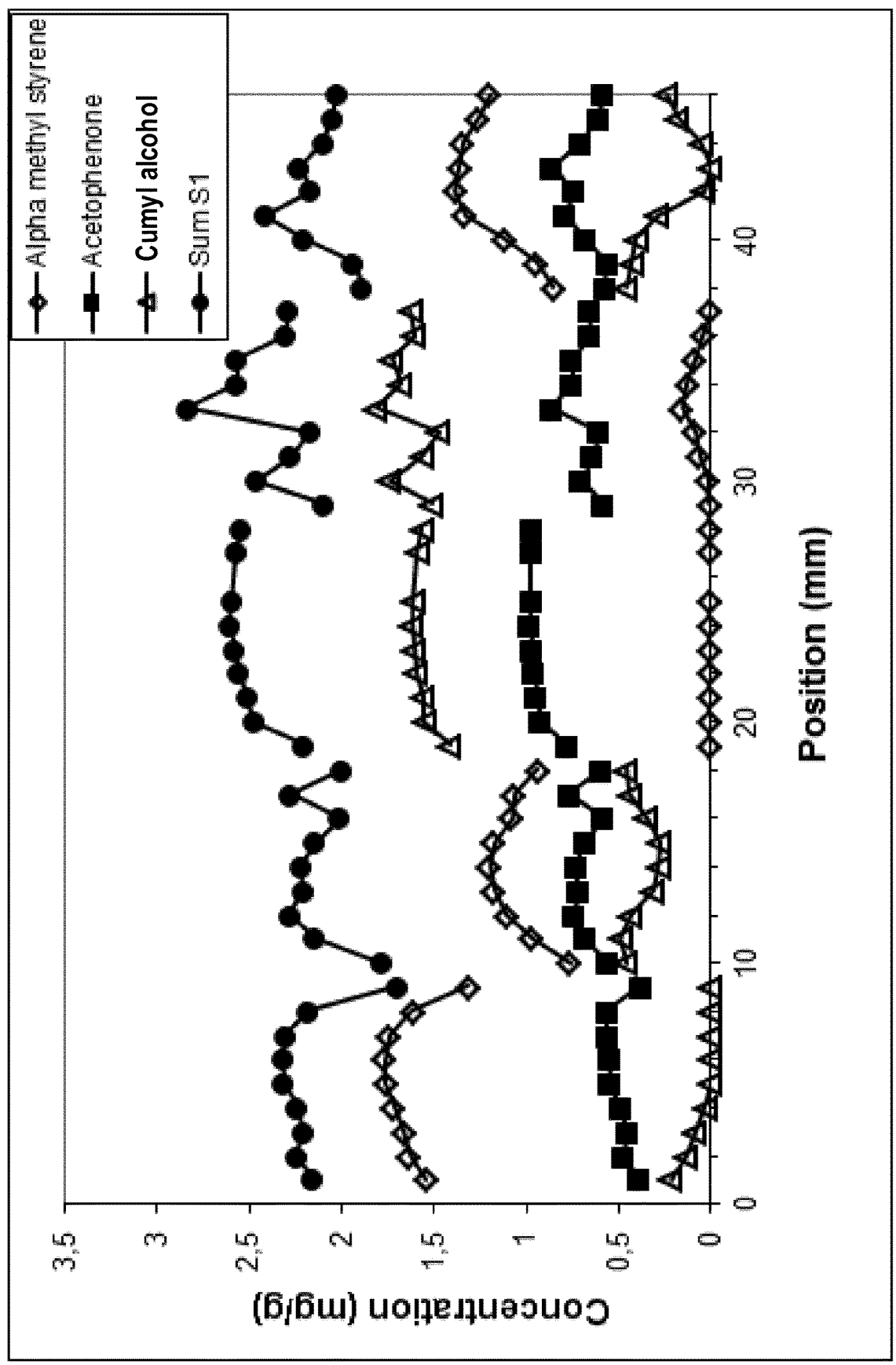
FIG. 8 shows gas chromatography concentration measurements of the various dicumyl peroxide by-products in the reference and experimental samples.

The results are show in FIG. 8. Positions 1-9 are from Sample 1; 10-18 are from Sample 2; 19-27 are from Sample 3; 28-36 are from Sample 4 and 37-45 are from Sample 5.

In order to assess the degree of water formation in the samples, the relative Cumyl-Alcohol (2-phenyl-2-propanol) and Alpha-Methyl-Styrene content of the samples should be compared.

Sample 1 shows the highest Alpha-Methyl-Styrene content and the Cumyl-Alcohol is almost completely decomposed. This means that long vulcanization time together with Santanox on the surface in presence of oxygen has the strongest effect on the Cumyl-Alcohol dehydration reactions. It follows that the high relative Alpha-Methyl-Styrene content correlates with a high formation of water in the pressed plate.

Sample 2 and Sample 5 also show high Alpha-Methyl-Styrene content and most of the Cumyl-Alcohol content is dehydrated and decomposed.

The most interesting are the results obtained from samples 3, 4 and 5. In samples 3 and 4 the Alpha-Methyl-Styrene content is very low and most of the Cumyl-Alcohol is preserved as the original. Both samples 3 and 4 are pressed in Nitrogen environment which shows that oxidization has a dominating effect. Sample 4 shows some low Alpha-Methyl-Styrene content in the center, which means that presence of Santonox also may contribute somewhat to the reactions. Nevertheless the presence of oxygen is the predominant reason for dehydration. The only difference between samples 4 and 5 is the presence of normal air (including Oxygen) between the tapes before pressing; this confirms the negative influence of oxygen on the chemical composition of the final polymer.

These studies clearly show that presence of oxygen in contact with the tapes during the vulcanization step leads to the chemical reactions of Cumyl-Alcohol dehydration and formation of Alpha-Methyl-Styrene and water. This negative effect is avoided if an oxygen-free atmosphere, in this case Nitrogen, is used when the winding is performed.

It should be understood that the above description of preferred embodiments has been made in order to exemplify the invention, and that alternative solutions will be obvious for a person skilled in the art, however without departing from the scope of the invention as defined in the appended claims supported by the description and the drawings.

The invention claimed is:

1. A process for producing a flexible vulcanized joint between two electric power cables, each cable having a metal conductor and an electric insulation system radially surrounding the conductor, the electric insulation system having an inner semi-conducting layer, an insulation layer, and an outer semi-conducting layer, the process comprising the following steps:
   i) Producing an exposed conductor joint between each end of the two cable ends to be joined;
   ii) Producing an inner semi-conducting layer that radially surrounds and covers the exposed conductor joint;
   iii) Winding an insulation tape including an organic peroxide around the inner semi-conducting layer thereby radially surrounding and covering the inner semi-conducting layer;
   iv) Curing the insulation tape and thereby producing an insulation layer; and
   v) Producing an outer semi-conducting layer that radially surrounds and covers the insulation layer;
   wherein the step iii) of winding the insulation tape around the inner semi-conductor layer is performed under an oxygen-free atmosphere.

2. The process according to claim 1, wherein the oxygen-free atmosphere includes at least one of nitrogen, carbon dioxide, or a noble gas.

3. The process according to claim 1, wherein the step iii) of winding the insulation tape around the inner semi-conducting layer is performed in a glovebox at a gas pressure in excess of an ambient atmospheric pressure.

4. The process according to claim 1, wherein the insulation tape comprises a polyolefin.

5. The process according to claim 1, wherein the organic peroxide used in step iii) for producing the insulation layer is selected from one of dicumyl peroxide, bis(t-butylperoxy-isopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof.

6. The process according to claim 1, wherein the step ii) of producing the inner semi-conducting layer includes the sub-steps of:
   ii)a. Winding a semi-conducting film including an organic peroxide around the exposed conductor joint thereby radially surrounding and covering the exposed conductor joint, the organic peroxide being selected from one of bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof;
   ii)b. Curing the semi-conducting film and thereby producing the inner semi-conducting layer.

7. The process according to claim 1, wherein the step v) of producing the outer semi-conducting layer includes the sub-steps of:
   v)a. Winding a semi-conducting film including an organic peroxide around the insulation layer thereby radially surrounding and covering the insulation layer, the organic peroxide being selected from one of bis(t-butylperoxyisopropyl)benzene, t-butyl cumyl peroxide, 2,5-di(t-butylperoxy)-2,5-dimethylhexane, n-butyl-4,4'-di(t-butylperoxy)valerate, 1,1'-di(t-butylperoxy)-3,3,5-trimethylcyclohexane, or mixtures thereof;
   v)b. Curing the semi-conducting film and thereby producing the outer semi-conducting layer.

8. The process according to claim 6, wherein the sub-step ii)a is performed under an oxygen-free atmosphere, wherein the oxygen-free atmosphere includes at least one of nitrogen, carbon dioxide, or a noble gas.

9. The process according to claim 6, wherein the sub-step ii)a is performed in a glovebox at a gas pressure in excess of an ambient atmospheric pressure.

10. The process according to claim 4, wherein the polyolefin is LDPE polyethylene.

11. The process according to claim 5, wherein the organic peroxide is dicumyl peroxide.

12. The process according to claim 7, wherein the sub-step v)a is performed under an oxygen-free atmosphere, wherein the oxygen-free atmosphere includes at least one of nitrogen, carbon dioxide, or a noble gas.

13. The process according to claim 7, wherein the sub-step v)a is performed in a glovebox at a gas pressure in excess of an ambient atmospheric pressure.

* * * * *